United States Patent
Kawada

(10) Patent No.: US 6,168,402 B1
(45) Date of Patent: Jan. 2, 2001

(54) SCROLL-TYPE COMPRESSOR HAVING POWER TRANSMISSION MECHANISM ALLOWING IDLING

(75) Inventor: Minoru Kawada, Nishi-kasugai-gun (JP)

(73) Assignee: Mitsubishi Heavy Industries, Ltd., Tokyo (JP)

( * ) Notice: Under 35 U.S.C. 154(b), the term of this patent shall be extended for 0 days.

(21) Appl. No.: 09/295,415

(22) Filed: Apr. 21, 1999

(30) Foreign Application Priority Data

May 11, 1998 (JP) .................................................. 10-127920

(51) Int. Cl.[7] .............................. F04C 18/04; F04C 29/00
(52) U.S. Cl. ......................... 418/55.1; 418/69; 192/56.1; 464/37
(58) Field of Search ...................... 418/55.1, 69; 464/35, 464/37; 192/56.1

(56) References Cited

U.S. PATENT DOCUMENTS

| 3,067,597 | 12/1962 | Sauerbrey | 464/37 |
| 5,273,409 | * 12/1993 | Swain | 418/69 |

FOREIGN PATENT DOCUMENTS

| 661 560 | 7/1987 | (CH) . | |
| 0 643 224 | 3/1995 | (EP) . | |
| 621098 | * 1/1927 | (FR) | 464/37 |
| 879 063 | 10/1961 | (GB) . | |
| 4-160230 | * 6/1992 | (JP) | 464/35 |

OTHER PUBLICATIONS

Patent Abstracts of Japan, vol. 008, No. 220 (M–330), Oct. 6, 1984, JP 59 103033, Jun. 14, 1984.

* cited by examiner

*Primary Examiner*—John J. Vrablik
(74) *Attorney, Agent, or Firm*—Oblon, Spivak, McClelland, Maier & Neustadt, P.C.

(57) ABSTRACT

The invention relates to a scroll-type compressor which will not exert an undesirable influence on a power source of a rotation shaft, even if seizing occurs between an orbiting scroll member and a fixed scroll member. A power transmission mechanism P is provided between a rotation shaft 7 and an eccentric drive pin 25 for transmitting power to an orbiting scroll member 14. An inner wall of a bore of a closed ended cylindrical member 40 with an eccentric drive pin 25 protruding from a base end thereof is formed in the height direction of the cylinder with a plurality of grooves 44 of semi-circular cross-section. Moreover, a cylindrical resilient roller 43 is centrally provided on the closed end with a height approximately the same as that of the closed ended cylindrical member 40. Rollers 42 are provided so as to be inscribed in each groove 44 and so as to come into contact with an outer peripheral surface of the resilient roller 43. Projections 41 provided on the rotation shaft 7 are insertingly fitted so as to fill the spaces between the rollers 42.

4 Claims, 2 Drawing Sheets

SCROLL-TYPE COMPRESSOR HAVING POWER TRANSMISSION MECHANISM ALLOWING IDLING

BACKGROUND OF THE INVENTION

1. Field of the Invention

The present invention relates to an air conditioning apparatus for keeping a room environment in a comfortable state. More particularly the invention relates to a scroll-type compressor which is a constituent element of the air conditioning apparatus.

2. Description of the Related Art

With an air conditioning apparatus, a compressor is provided as a constituent element of a refrigerant circuit. The compressor is for compressing a gas refrigerant forwarded from an indoor heat exchanger (or an outdoor heat exchanger), and discharging this as a high temperature and high pressure gas refrigerant. Hence, at the time of cooling, even with the outside air temperature high, the refrigerant can discharge heat to the outdoor air through the medium of the outdoor heat exchanger, while at the time of heating, it can impart heat to the indoor air through the medium of the indoor heat exchanger. Moreover, refrigerant circulation involving discharging and/or imparting heat can be realized.

Various forms of compressor have been proposed, one form being the scroll-type compressor. This compressor is composed mainly of two parts, that is, a fixed scroll member and an orbiting scroll member, each provided with spiral wrap portions. These parts are assembled together such that the wraps of each are engaged with each other. The assembled condition is such that the orbiting scroll member and the fixed scroll member are made eccentric to each other by an orbit radius, and such that the spiral wraps engage with each other 180 degrees apart. The refrigerant is introduced into a space (compression chamber) between the engaged wraps. Compression of the refrigerant is realized correspondingly to the compression chamber moving towards the center of the scrolls due to the orbiting scroll member being rotated eccentrically relative to the fixed scroll member, so that the volume gradually reduces.

A rotation shaft for transmitting rotation power is connected to the orbiting scroll member in the scroll-type compressor. The rotation shaft is connected to the orbiting scroll member with an eccentric condition of a central axis of the rotation shaft corresponding to the eccentric engagement of the orbiting scroll member and the fixed scroll member. Moreover, in particular with a vehicle air conditioning apparatus, the rotation shaft is connected to an engine belt via an electromagnetic clutch or the like to thereby transmit power to the rotation shaft.

With the scroll-type compressor described above, since the respective spiral wrap portions of the fixed scroll member and the orbiting scroll member have portions which rotate at relatively high speed and come into contact with each other, lubricating oil is always supplied. However, there can be the case where adhesion, i.e., seizing occurs between the fixed scroll member and the orbiting scroll member by way of their spiral wrap portions, due to the supply of lubricating oil stopping or some other reason as a result of a problem.

If seizing occurs between both members, the orbiting scroll member is unable to rotate, resulting in a large resistance to the force being imparted by the rotation shaft. As a result an overload is applied to the electromagnetic clutch so that the internal windings thereof burn out, and the engine belt slips. Moreover, in a worst case where the above situation becomes extreme, there may be a case where the engine belt is severed, or in a completely locked state, operation of the engine becomes impossible.

SUMMARY OF THE INVENTION

In view of the above situation, it is an object of the present invention to provide a scroll-type compressor which will not exert an undesirable influence on the power source of the rotation shaft, even if seizing occurs between the orbiting scroll member and the fixed scroll member.

To address the above problems, the present invention provides the following means. That is to say, the scroll-type compressor according to a first aspect to the invention comprises: a rotation shaft; an eccentric drive pin located on a part positioned away from a central axis of the rotation shaft; an orbiting scroll member to which power is transmitted from the rotation shaft via the eccentric drive pin; a fixed scroll member fitted to the orbiting scroll member such that spiral wraps of each are engaged with each other; and a power transmission mechanism having a function for transmitting power from the rotation shaft to the eccentric drive pin, and for idling the rotation shaft when the orbiting scroll member is unable to operate.

With the scroll-type compressor according to a second aspect of the invention, the power transmission mechanism couples the rotation shaft and the eccentric drive pin which are formed as separate bodies, and transmits power from the rotation shaft to the eccentric pin.

With the scroll-type compressor according to a third aspect of the invention, the power transmission mechanism comprises: a closed ended cylindrical member with grooves having a substantially semi-circular cross-section formed in an inner wall of a bore of the cylindrical member in a height direction thereof, and with the eccentric drive pin protrudingly provided at a position eccentric to the center of the closed end; a cylindrical resilient roller centrally provided on the closed end inside the bore of the closed ended cylindrical member; and rollers provided so as to be inscribed in the substantially semi-circular cross-section grooves, and so as to come into contact with an outer peripheral surface of the resilient roller, and projections formed at a tip of the rotation shaft are insertingly fitted so as to fill spaces between the rollers.

According to the present invention, when the orbiting scroll member is unable to be operated by the power transmission mechanism, the rotation shaft is idled. Hence there is no problem such as an overload being applied to the power source which transmits power to the rotation shaft.

DESCRIPTION OF THE PREFERRED EMBODIMENT

An embodiment of the present invention will now be described with reference to the accompanying drawings. With the present embodiment, explanation will be made with regard to a scroll-type compressor mounted in a vehicle air conditioning apparatus.

Figure 3:
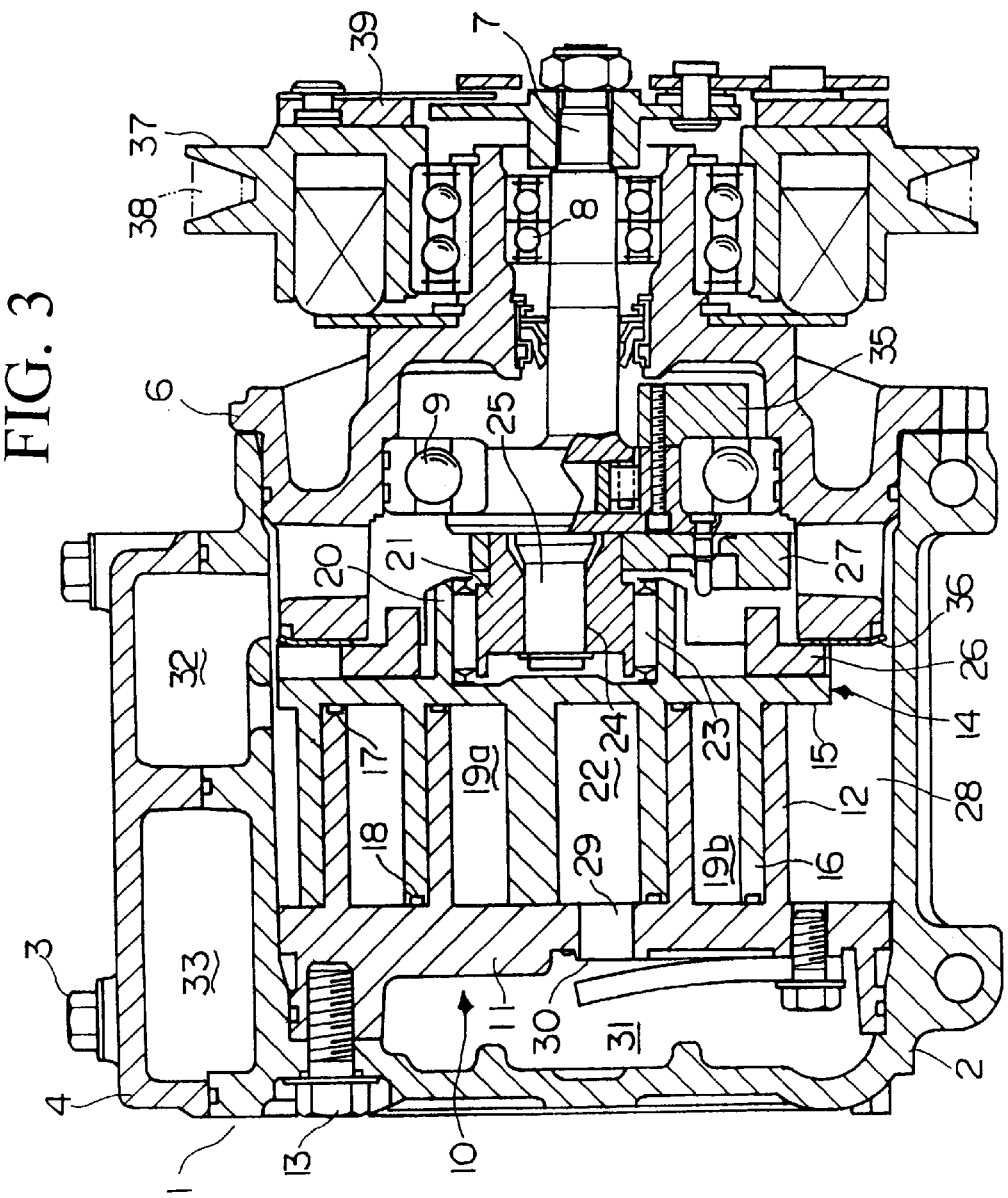
FIG. 3 is a cross-sectional view showing the overall construction of a scroll-type compressor.

FIG. 3 is a sectional view showing the overall construction of a scroll-type compressor. The external form is made up of a sealed housing 1, with a cup-shaped body 2, a cover 4 tightened securely to the cup-shaped body 2 with bolts 3, and a cylindrical member 6 also tightened securely to the cup-shaped body 2 with bolts (not shown in the figure).

Inside the sealed housing 1 are disposed a fixed scroll member 10 and an orbiting scroll member 14. These members are central to the construction of the scroll-type compressor. The fixed scroll member 10 comprises a substantially disk-shaped end plate 11 and a spiral wrap 12 upstanding from an inner face thereof. The end plate 11 is tightened securely to the cup-shaped body 2 by bolts 13.

The inside of the sealed housing 1 is partitioned by bringing the outer peripheral face of the end plate 11 into close contact with the inner peripheral face of the cup-shaped body 2. The partitioned space is divided up such that an outer side of the end plate 11 is for a high pressure side chamber 31 and an inner side of the end plate 11 is for a low pressure side chamber 28. An inlet chamber 32 and a discharge chamber 33 are formed in a joining portion between the cover 4 and the cup-shaped body 2. The high pressure side chamber 31 is communicated with the discharge chamber 33 through a passage (not shown in the figure), and the low pressure side chamber 28 is directly communicated with the inlet chamber 32. A discharge port 29 is formed in the center of the end plate 11. The discharge port 29 is opened and closed by a discharge valve 30.

The orbiting scroll member 14 comprises a substantially disk-shaped end plate 15 and a spiral wrap 16 upstanding from an inner face thereof. The spiral wrap 16 has substantially the same shape as the spiral wrap 12 of the fixed scroll member 10.

The orbiting scroll member 14 and the fixed scroll member 10 are made eccentric to each other by an orbit radius, and are assembled such that the spiral wraps 12 and 16 engage with each other 180 degrees apart, as shown in the figure. Hence, a tip seal 17 embedded in a tip end face of the spiral wrap 12 comes into close contact with the inner face of the end plate 15, and a tip seal 18 embedded in a tip end face of the spiral wrap 16 comes into close contact with the inner face of the end plate 11, and the side faces of the spiral wraps 12 and 16 are brought into linear contact with each other at several places, thereby forming a plurality of compression chambers 19a and 19b having point symmetry relative to the center of the scroll.

A drive bushing 21 is rotatably fitted via an orbit bearing 23 into a cylindrical boss 20 bored into a central part of an outer face of the end plate 15. Moreover, a rotation shaft 7 is passed through the cylindrical member 6 and is rotatably supported within the sealed housing 1 by means of bearings 8 and 9. An electromagnetic clutch 37 is connected via an armature plate 39 to an end of the rotation shaft 7 located outward of the cylindrical member 6, and an engine belt 38 is connected to the electromagnetic clutch 37. The engine belt 38 is for transmitting power from a vehicle propulsion engine (not shown). An eccentric drive pin 25 to which the rotation of the rotation shaft 7 is transmitted, is provided at an opposite end of the rotation shaft 7 (that is, the end in the sealed housing 1), at a position eccentric to the axial center of the rotation shaft 7. The eccentric drive pin 25 is slidably fitted into a slide groove 24 formed on an inside face of the drive bushing 21.

Figure 1:
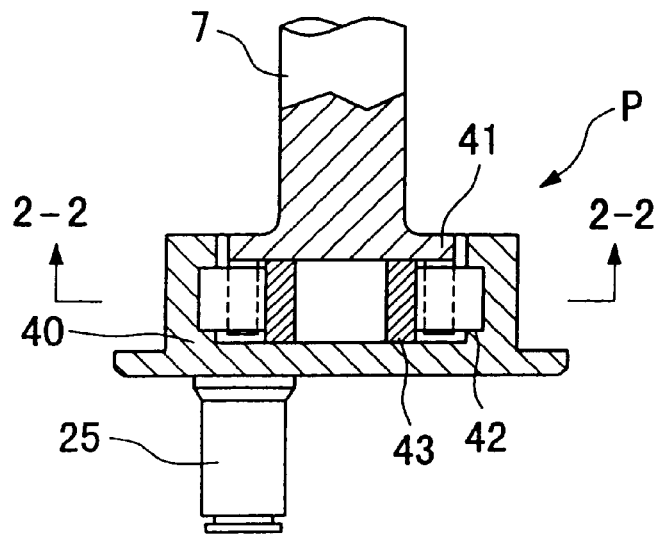
FIG. 1 is a sectional view of a power transmission mechanism for coupling a rotation shaft and an eccentric drive pin.
Figure 2:
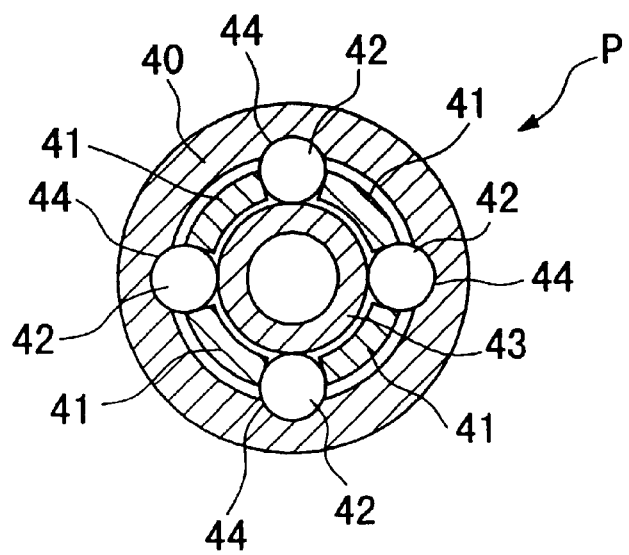
FIG. 2 is a sectional view taken along section 2—2 in FIG. 1.

The rotation shaft 7 and the eccentric drive pin 25 in the present embodiment are constructed as separate bodies, and are coupled by a power transmission mechanism P. As shown in FIG. 1 and FIG. 2, projections 41 are protrudingly provided at the end of the rotation shaft 7, and a closed ended cylindrical member 40 is provided at a base end of the eccentric drive pin 25, and the projections 41 and the closed ended cylindrical member 40 are combined together by means of rollers 42. Accordingly, the eccentric drive pin 25 is protrudingly provided at a position eccentric to the center of the closed ended cylindrical member 40.

The construction of the power transmission mechanism P is as described below.

Grooves 44 having a substantially semi-circular section, are formed in an inner wall of a bore of the closed ended cylindrical member 40, in the height direction of the cylinder. The grooves 44 are severally formed at the 0, 3, 6 and 9 o'clock positions on the cylinder cross-section. Moreover, a cylindrical resilient roller 43 is centrally provided on the closed end with a height approximately the same as that of the cylindrical member 40. As the material for the resilient roller 43, spring steel is used. Plastic or resin materials such as rigid rubber may also be used as the material for the resilient roller, and other materials are also possible. Rollers 42 are provided so as to be inscribed in each groove 44 and so as to come into contact with an outer peripheral surface of the resilient roller 43. The projections 41 are insertingly fitted so as to fill the spaces between the rollers 42. Power transmission from the rotation shaft 7 to the orbiting scroll member 14 is achieved by the power transmission mechanism P constructed as described above.

Moreover, in order to balance the dynamic imbalance due to the orbital motion of the orbiting scroll member 14, a balance weight 27 is attached to the drive bushing 21 to move the center of gravity in a direction 180 degrees to that of the eccentric drive pin 25 about the rotation shaft 7. For the same purpose, a balance weight 35 is provided on the outside of the bearing 9. Furthermore, a thrust bearing 36 is provided between the outer face periphery of the end plate 15 of the orbiting scroll member 14, and the inner end face of the cylindrical member 6. An Oldham coupling 26 which allows orbital motion of the orbiting scroll member 14, but prevents rotation about its axis, is provided on the outside of the end plate 15.

The operation and the effect of the scroll-type compressor constructed as described above will now be described.

When the rotation shaft 7 is rotated by the power transmitted via the engine belt 38 and the electromagnetic clutch 37, the orbiting scroll member 14 is moved on the radius of orbit, that is, on a circular orbit with the eccentric amount between the rotation shaft 7 and the eccentric drive pin 25 as a radius, by means of an orbital drive mechanism comprising the eccentric drive pin 25, the drive bushing 21 and the cylindrical boss 20. At this time, rotation of the orbiting scroll member 14 about its axis is prevented by the Oldham coupling 26. Therefore, the linearly contacting portions on the side faces of spiral wraps 12 and 16 gradually move towards the center of the spiral, and as a result, the compression chambers 19a and 19b move towards the center of the spiral while reducing in volume. Accompanying this, gas flowing in from an inlet port (not shown in the figure), through the inlet chamber 32 to the low pressure side chamber 28, is drawn into each compression chamber 19a, 19b from an outer end opening of the spiral wraps 12 and 16, and reaches the central chamber 22 while being compressed. The gas then passes through the discharge port 29, pushing the discharge valve 30 open, and is discharged towards the high pressure side 31 and flows to the outside through the discharge port (not shown) via the discharge chamber 33.

At this time, the power transmission from the rotation shaft 7 to the orbiting scroll member 14 is realized by the power transmission mechanism P. That is, the torque applied to the projections 41 is transferred to the rollers 42, which then push the grooves 44 to thereby rotate the closed ended cylindrical member 40. Since the eccentric drive pin 25 is protrudingly provided integral with the closed ended cylindrical member 40, the eccentric drive pin 25 also rotates to transmit the rotation force to the drive bushing 21 in the cylindrical boss 20, thereby rotating the orbiting scroll member 14.

The case will be considered where a situation such as seizing occurs between the spiral wraps 16 and 12 of the orbiting scroll member 14 and the fixed scroll member 10 respectively. In this case, the orbiting scroll member 14 is locked relative to the fixed scroll member 10, and hence the orbiting scroll member 14, the drive bushing 21, the eccentric drive pin 25 and the closed ended cylindrical member 40 cannot rotate. However, the rotation force originating from the engine belt 38, that is, from the engine (not shown), continues to be applied to the rotation shaft 7. At this time, this rotation force becomes a force to disengage the rollers 42 from the grooves 44. That is, the rollers 42 are brought into contact with the resilient roller 43. Hence, the rollers 42 deform the resilient roller 43, moving towards the axial center of the rotation shaft 7. As a result, the rollers 42 disengage from the grooves 44 and slide around the inside so that the rotation shaft 7 starts to idle.

Due to such action, then in the case where the rotation shaft 7 of the scroll-type compressor is unable operate, by allowing this to idle the electromagnetic clutch 37 and the engine belt 38 are able to continue to operate normally. That is to say, burnout of the windings inside of the electromagnetic clutch 37, or slipping of the engine belt 38 does not occur, and hence a situation where the engine becomes inoperable is avoided.

With the present embodiment, a scroll-type compressor mounted in a vehicle air conditioning apparatus has been described as an example. The present invention however is by no means limited to this example. For example, the present invention is applicable to a room air conditioner installed in a house, or any other type of air conditioning apparatus.

Furthermore, with the present invention, in the construction of the power transmission mechanism P, the arrangement of the grooves 44 and rollers 42, and the arrangement number thereof is not limited to the case shown in FIG. 1 and FIG. 2. That is to say, the number of grooves 44 and rollers 42 may be for example three each, or six each.

As described above, the scroll-type compressor of the present invention incorporates a power transmission mechanism having a function of idling the rotation shaft when the orbiting scroll member is unable to operate. Hence, the undesirable situation where an overload is applied to the power source which transmits power to the rotation shaft, does not arise. Consequently, irreparable damage to an air conditioning apparatus in which this scroll-type compressor is mounted can be avoided.

What is claimed is:

1. A scroll-type compressor comprising:
   a rotation shaft;
   an eccentric drive pin located on a part positioned away from a central axis of said rotation shaft;
   an orbiting scroll member to which power is transmitted from said rotation shaft via said eccentric drive pin;
   a clutch positioned in a drive path between said orbiting scroll member and a power source which drives said rotation shaft;
   a fixed scroll member fitted to said orbiting scroll member such that spiral wraps of each are engaged with each other; and
   a power transmission mechanism separate from said clutch and having a function of transmitting power from said rotation shaft to said eccentric drive pin, and for idling said rotation shaft when a load on said orbiting scroll member exceeds a certain value.

2. A scroll-type compressor according to claim 1, wherein said power transmission mechanism couples said rotation shaft and said eccentric drive pin which are formed as separate bodies, and transmits power from said rotation shaft to said eccentric drive pin.

3. A scroll-type compressor according to claim 1 or 2, wherein said power transmission mechanism comprises:
   a closed ended cylindrical member with grooves having a substantially semi-circular cross-section formed in an inner wall of a bore of the cylindrical member in a height direction thereof, and with said eccentric drive pin protrudingly provided at a position eccentric to the center of the closed end;
   a cylindrical resilient roller centrally provided on the closed end inside the bore of said closed ended cylindrical member; and
   rollers provided so as to be inscribed in said substantially semi-circular cross-section grooves, and so as to come into contact with an outer peripheral surface of said resilient roller, and projections formed at a tip of said rotation shaft are insertingly fitted so as to fill spaces between said rollers.

4. A scroll-type compressor according to claim 1, wherein said clutch is a magnetic clutch.

* * * * *